3,451,515
PILOT BEARING FOR DISCONNECT COUPLING
Norman J. Anderson, Erie, Pa., assignor to Zurn Industries, Inc., Erie, Pa., a corporation of Pennsylvania
Filed Aug. 28, 1967, Ser. No. 663,772
Int. Cl. F16d 11/04, 11/10, 13/22
U.S. Cl. 192—67                      5 Claims

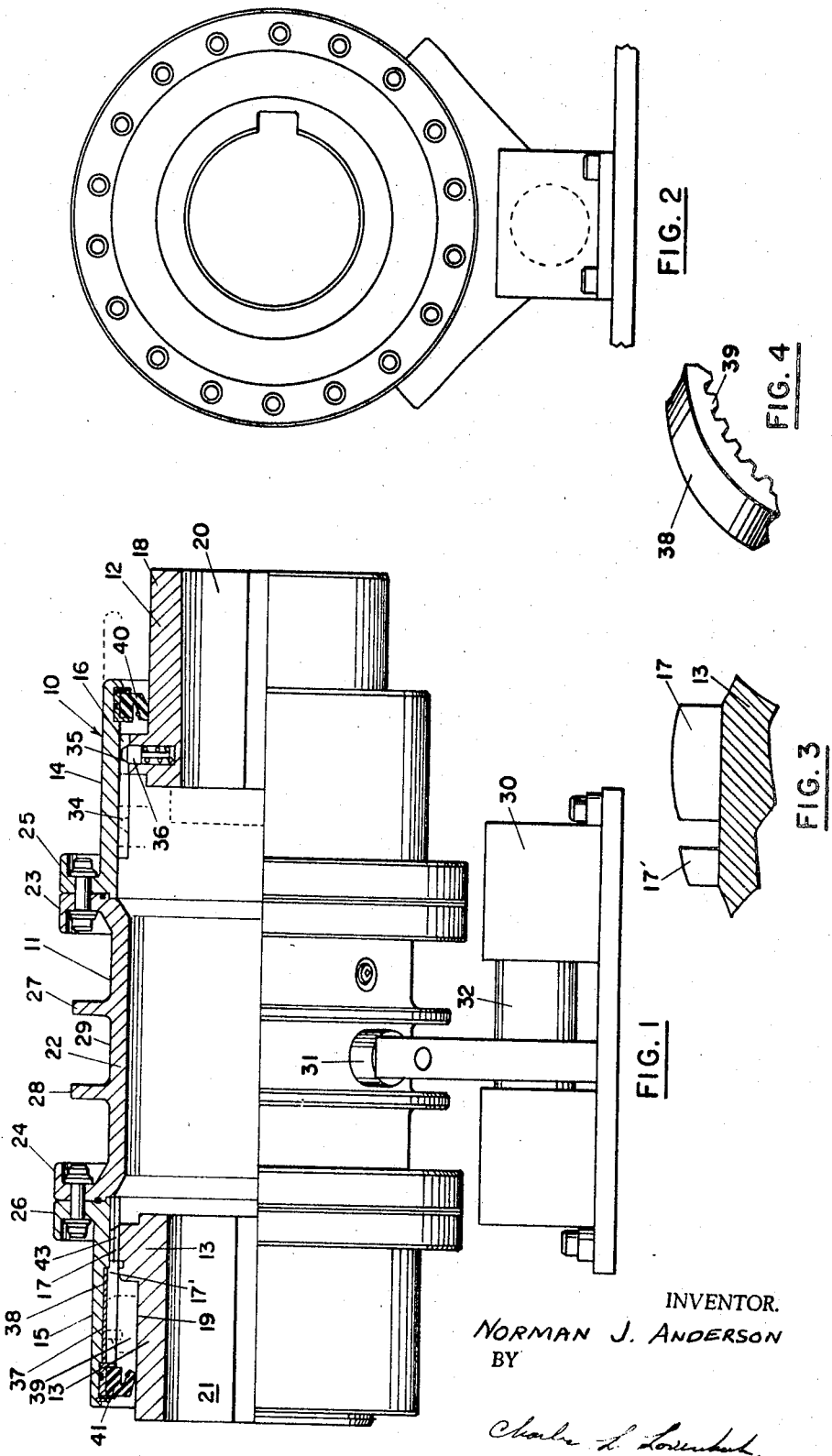

ABSTRACT OF THE DISCLOSURE

The coupling disclosed herein provides a bearing support by way of a ring having an outer cylindrical peripheral surface that engages a cylindrical bearing surface in the coupling to keep the tips of the disengaged hub teeth in radial alignment with the sleeve teeth. Thus, when the sleeve teeth and the hub teeth are disengaged, they rotate the ring with them. This assures that the differential movement will be at the bearing surface between the outside of the ring and the inside of the sleeve, rather than on tips of the hub teeth themselves and assures axial shifting into engagement and disengagement without interference between the hub and gear teeth.

---

This invention relates to couplings and, more particularly, to gear type couplings.

It is, accordingly, an object of the invention to provide an improved gear coupling.

Another object of the invention is to provide a gear coupling that is simple in construction, economical to manufacture and simple and efficient to use.

Another object of the invention is to provide an improved gear type coupling in combination with a bearing for supporting the sleeve when it is disengaged.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 1 is a partial longitudinal cross sectional view of the coupling according to the invention.

FIG. 2 is an end view of the coupling.

FIG. 3 is an enlarged longitudinal cross sectional view showing the side faces of the hub teeth.

FIG. 4 is an enlarged isometric partial view of the ring.

Now with more particular reference to the drawings, the coupling 10 shown has a sleeve 11 and first hub 12 and second hub 13. The sleeve 11 has a first end 14 and a second end 15. The first hub 12 has external teeth 16 and the second hub 13 has external teeth 17 with a second row of teeth 17' axially aligned with and axially spaced from the first teeth 17. The first hub has a cylindrical surface 18 that engages the sealing ring 40 to provide an oil seal at this point and a second seal ring 41 engages the cylindrical surface 19. First hub has a bore 20 and the second hub has a bore 21 for receiving a driving and a driven shaft respectively. The spacer 22 is connected by means of the flanges 23 and 24 to flanges 25 and 26 respectively on the two sleeve ends. The flanges 27 and 28 on the spacer 22 define a groove 29 into which the roller 31 on the actuator 30 moves to shift the sleeve from the engaged position to the disengaged position. The shifting cylinder 32 on the actuator 30 operates the shifting arrangement by means of hydraulic pressure in a manner familiar to those skilled in the art.

Grooves 34 and 35 receive the detents 36 in teeth 16 to hold the sleeve in its particular shifted position.

A bearing surface 37 of sleeve end 15 engages the outer periphery of a cylindrical ring 38 and the cylindrical ring may freely rotate on the surface 37. The teeth 39 on the ring 38 engage the second row of teeth 17' on the hub 13 when the coupling is in the engaged position shown in FIG. 1, as well as when the sleeve is moved in the direction toward FIG. 2 to disengage hub teeth 17 from sleeve teeth 43, thus, the ring 38 rotates with the hub 13 at all times. The teeth 17 on the hub 13 slide out of engagement with the sleeve teeth 43 and slide into engagement with ring teeth 39 when the sleeve is shifted from the position shown toward the right so that the detent 36 engages the notches 34. The ring 38 thus pilots the hub 13 in the sleeve and maintains it in proper alignment. The second position of first hub 12, sleeve end 14, teeth 17 and 17' is shown in dotted lines in FIG. 1.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling comprising a sleeve, having a first end and a second end,
   first internal teeth in said first end of said sleeve,
   second internal teeth in said second end of said sleeve,
   a first hub and a second hub,
   first external teeth on said first hub engaging said first sleeve teeth,
   second external teeth on said second hub engaging said second sleeve teeth,
   said sleeve being slidable from a first position to a second position bringing first hub teeth from a first position on said first sleeve teeth in said first position to a second position on said sleeve teeth,
   means to restrain said sleeve holding it in said first position and in said second position,
   means to move said sleeve from said first position to said second position,
   said second sleeve teeth engaging said second hub teeth when said sleeve is in said first position,
   said second sleeve teeth being out of engagement with said second hub teeth when said sleeve is shifted to said second position,
   an internal generally cylindrical bearing surface on the inner periphery of said sleeve adjacent said second sleeve teeth,
   a ring having an outer cylindrical surface received in said bearing surface,
   internal teeth in said ring,
   said second hub teeth terminating and engaging said teeth in said ring when said sleeve is in either said first or said second position.

2. The coupling recited in claim 1 wherein said bearing surface is made of a material dissimilar to the material of said teeth on said second hub.

3. The coupling recited in claim 1 wherein each said hub has an outer peripheral cylindrical surface disposed axially outwardly of said teeth,
and a sealing ring on each said end of said sleeve sealingly engaging said cylindrical surface, providing a lubricant space inside said coupling.

4. The coupling recited in claim 1 wherein an outer peripheral groove is provided in said sleeve,
and shifting means is provided engaging said groove to shift said sleeve from said first position to said second position.

5. The coupling recited in claim 1 wherein said second teeth in said second coupling comprise a second row of teeth spaced from said first mentioned row of teeth, said second row of teeth being in engagement with said teeth in said ring when said sleeve is shifted to said first position and second position.

References Cited

UNITED STATES PATENTS

| 2,603,325 | 7/1952 | Pickard | 192—67 |
| 3,265,174 | 8/1966 | Polzin | 192—67 |
| 1,938,824 | 2/1933 | Fish | 192—53.7 XR |

FOREIGN PATENTS 1,259,282   3/1961   France.

BENJAMIN W. WYCHE III, *Primary Examiner.*

U.S. Cl. X.R.

192—110